No. 624,529. Patented May 9, 1899.
H. PAAR.
SOFT TREAD HORSESHOE.
(Application filed Feb. 17, 1899.)
(No Model.)
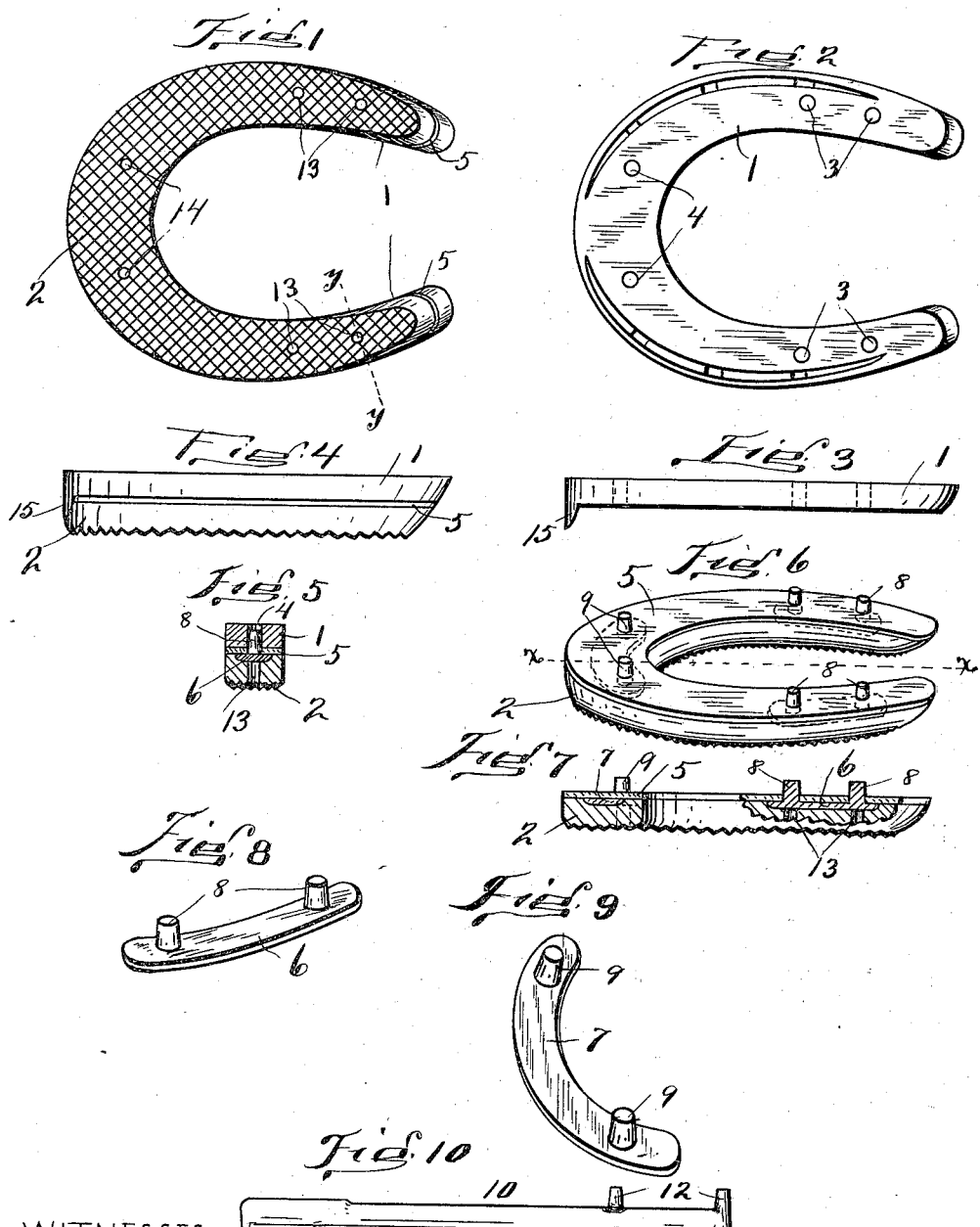

UNITED STATES PATENT OFFICE.

HENRY PAAR, OF CANTON, OHIO, ASSIGNOR OF ONE-HALF TO ADAM THOMAS, OF SAME PLACE.

SOFT-TREAD HORSESHOE.

SPECIFICATION forming part of Letters Patent No. 624,529, dated May 9, 1899.

Application filed February 17, 1899. Serial No. 705,763. (No model.)

*To all whom it may concern:*

Be it known that I, HENRY PAAR, a citizen of the United States, residing at Canton, in the county of Stark and State of Ohio, have invented certain new and useful Improvements in Soft-Tread Horseshoes; and I do hereby declare that the following is a full, clear, and exact description of the same, reference being had to the annexed drawings, making a part of this specification, and to the figures of reference marked thereon, in which—

Figure 1 is a view showing the bottom or under side of the shoe, showing all the parts properly connected. Fig. 2 is a top view of the shoe. Fig. 3 is a side view showing the metal portion of the shoe. Fig. 4 is a side view of the shoe, showing all of the different parts properly connected. Fig. 5 is a transverse section through line $y\ y$, Fig. 1. Fig. 6 is a view showing the tread and also showing the connecting-plates in dotted lines. Fig. 7 is a section through line $x\ x$, Fig. 6, showing a portion of the tread broken away. Fig. 8 is a detached view of one of the heel-connecting plates. Fig. 9 is a detached view of the toe-connecting plate. Fig. 10 is a view of the tool designed for connecting the tread to the shoe-body proper.

The present invention has relation to soft-tread horseshoes; and it consists in the different parts and combination of parts hereinafter described, and particularly pointed out in the claim.

Similar numerals of reference indicate corresponding parts in all the figures of the drawings.

In the accompanying drawings, 1 represents the metal portion of the shoe, which is constructed in the ordinary manner, reference being had to the proper connection of the tread 2.

The body 1 is provided with the apertures 3 and 4, the apertures 3 being located at the heel end of the body 1 and the apertures 4 at the toe end thereof, said apertures being located and arranged substantially as shown in Fig. 2 and are for the purpose hereinafter described.

The tread 2 is substantially of the form shown, and, as shown, it conforms in size with the body 1, or substantially so.

Upon the upper side of the tread 2 is located the canvas section 5. This canvas section 5 is formed of what is known as "canvas rubber" and is of a shape and size to conform with the shape and size of the upper side of the tread 2.

During the time the tread 2 is in a plastic state the heel-plates 6 and the toe-plate 7 are placed in the tread and are located substantially as shown in the dotted lines, Fig. 6, after which the canvas section 5 is placed in proper position, which brings said section over the plates 6 and 7 and allows the tapered pins 8 and 9 to extend as illustrated in said Fig. 6, and, as illustrated, said pins extend above the canvas section 5, so that they can be placed in the apertures 3 and 4, by which means the tread 2 is connected to the body 1, and by reason of the taper of the pins 8 and 9 the tread can be so connected that it will not become detached when in use.

In use the body 1 may be connected to the hoof of a horse in the usual manner, after which the tread 6, together with all of its parts, is connected to said body 1 by forcing the pins 8 and 9 into the apertures 3 and 4.

For the purpose of providing a means for forcing the pins 8 and 9 in the proper apertures the tool 10 is provided, which tool consists of a bar provided with tangs or punches, such as 11 and 12, said tangs or punches being so arranged that they will come directly under the pins 8 and 9 when the tool is placed in proper position.

The tread 2 is provided with the apertures 13 and 14, which apertures are for the purpose of allowing the tangs or punches 11 and 12 to come in contact with the bottom or under side of the plates 6 and 7, and when so placed an ordinary hammer is used to drive the pins 8 and 9 into the apertures 3 and 4.

It will be understood that the canvas portion 5 is to be vulcanized onto the tread 2 at the time the tread 2 is vulcanized, by which arrangement the plates 6 and 7 are firmly fixed to the tread, and when the pins 8 and 9 are securely connected to the body 1 the tread will be securely fixed in proper position.

For the purpose of protecting the tread 2, together with the canvas section 5, at the toe end of the shoe the downward-extending lip or flange 15 is provided, which lip extends over the tread, as illustrated in Fig. 4.

When it is desired to remove the tread proper from the shoe-body 1, a chisel or other instrument is placed between the body 1 and the canvas portion 5 of the tread, by which means the pins 8 and 9 can be detached and a new tread can be placed in position.

Having fully described my invention, what I claim as new, and desire to secure by Letters Patent, is—

The combination of the body 1 provided with the apertures 3 and 4, the tread 2 provided with the canvas 5, the toe and heel plates 6 and 7 provided with the pins 8 and 9, and the plates fixed to the tread and the apertures 13 and 14 located in the tread, substantially as and for the purpose specified.

In testimony that I claim the above I have hereunto subscribed my name in the presence of two witnesses.

HENRY PAAR.

Witnesses:
  J. A. JEFFERS,
  F. W. BOND.